INVENTOR.
JOHN W. LUCE
BY RICHARD A. MORRETTE
ATTORNEYS

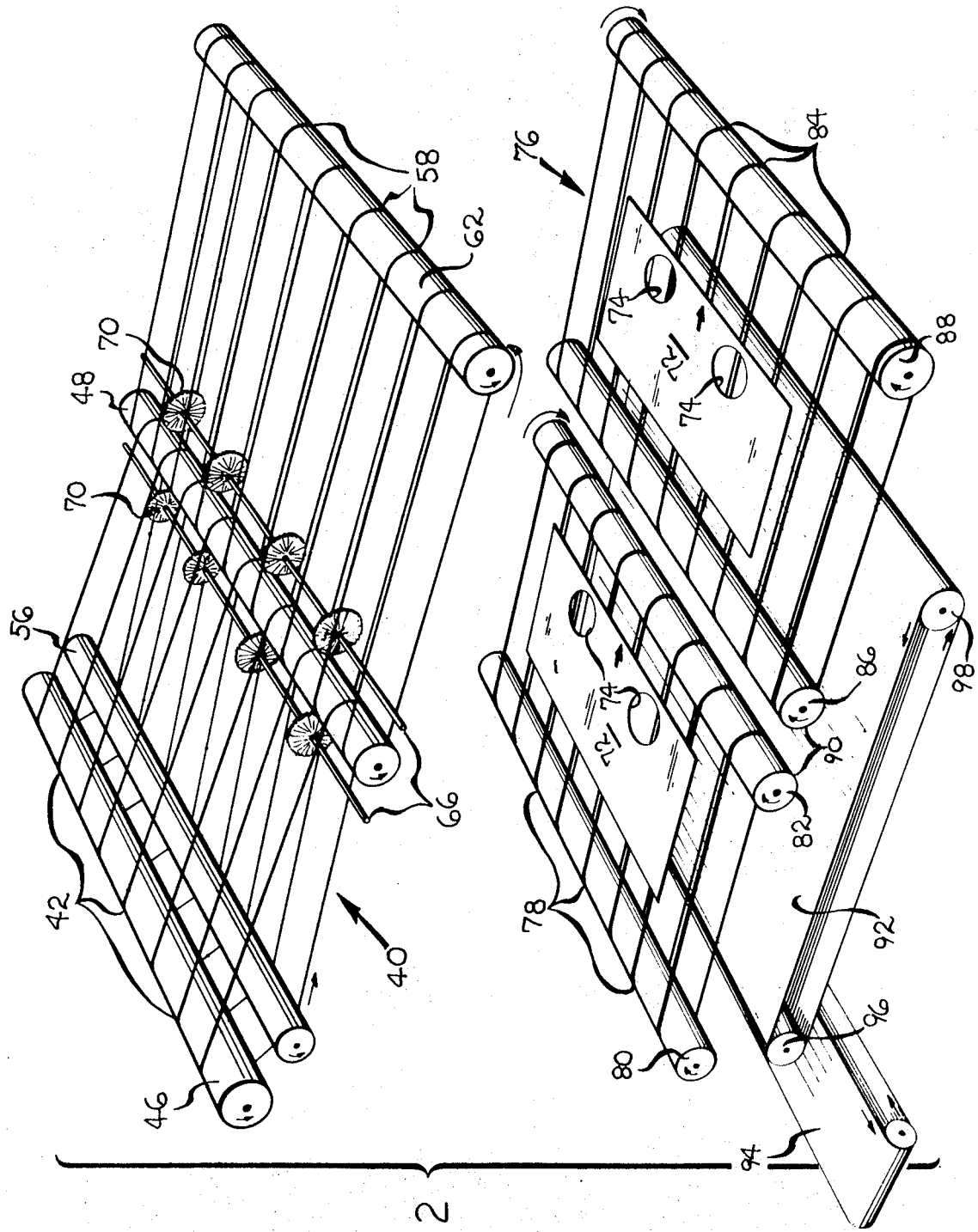

United States Patent Office 3,626,561
Patented Dec. 14, 1971

3,626,561
AUTOMATIC SHEET STACKER
John W. Luce, Maumee, Ohio, and Richard A. Morrette,
Temperance, Mich., assignors to Owens-Illinois, Inc.
Filed Dec. 15, 1969, Ser. No. 885,144
Int. Cl. B24b 39/00
U.S. Cl. 29—90.5                              6 Claims

ABSTRACT OF THE DISCLOSURE

An improved automatic sheet stacker for conveying individual sheets in precise alignment, removing scrap materials from the sheets as they are being conveyed, and depositing the sheets in a uniform stack at a collection point. This stacker features four sets of revolving conveyor belts, two upper sets and two lower sets, between which the individual sheets are securely held and conveyed in precise alignment. Also provided by this improved stacker are a plurality of revolving brushes, which are positioned to remove scrap material from the sheets being conveyed, and a conveyor system to collect and transport away the scrap particles removed by the revolving brushes.

BACKGROUND OF THE INVENTION

This invention relates to an improved automatic sheet stacker.

More specifically, this invention is an improvement on the type of automatic sheet stacker apparatus shown in U.S. Pat. No. 3,321,202 issued on May 23, 1967.

Automatic sheet stackers of the type described in the aforesaid Pat. No. 3,321,202 have widespread use throughout the corrugated paperboard industry. Such conventional sheet stackers are often used to convey individual paperboard sheets from a forming and sizing machine to a stacking location. One such use of these automatic sheet stackers has been in connection with rotary die cutters, which are utilized to size a sheet of corrugated paperboard to a preferred dimension and to cut various geometrical configurations into the paperboard sheet. It should be understood that as these rotary die cutters trim the edges of a corrugated paperboard sheet and cut various configurations into the sheet large quantities of scrap material are removed from the corrugated sheet. These pieces of scrap material frequently remain partially attached to the corrugated sheet as it leaves the rotary die cutter.

Conventional sheet stackers of the type described in the aforesaid U.S. Pat. No. 3,321,202 include one set of conveyor belts onto which the sheet is fed to be conveyed to a stacking location. It has been found that conventional sheet stackers are unable to run at the high speeds maintained by modern rotary die cutters. The reason behind this is that sheets are fed at such a rapid rate onto the sheet stacker that they frequently become misaligned or positioned at an angle on the conveyor belts so that when they are deposited at a stacking location the resulting stack is non-uniform and contains many misaligned sheets. In addition, the scrap materials which remain attached to the sheet are conveyed along with the sheet and also result in irregularities at the stacking location. Therefore, it can be seen that because conventional sheet stackers have no means of removing scrap materials which remain attached to paperboard sheets, the resulting stack is often uneven and irregular. Furthermore, if it is attempted to operate a conventional sheet stacker at a speed corresponding to the speed of the rotary die cutters, the sheets are conveyed so quickly that they move relative to the conveyor belts and thereby are misaligned when they are deposited at the stacking location. To solve these problems and utilize conventional sheet stackers with modern rotary die cutters, corrugated paperboard manufacturers have been forced to operate rotary die cutters at a much slower speed so as to be compatible with the sheet stackers. Additionally, they have had to provide manual labor to remove any excess scrap material which remain attached to the sheets. Obviousuly, these limitations have proved costly and resulted in less-than-capacity production of paperboard sheets.

Hence, there has been an obvious need for some time for an improved automatic sheet stacker which is compatible with a modern rotary die cutter and is adapted to be operated at high speeds and yet produce a uniform and prefectly aligned stack of individual paperboard sheets.

BRIEF SUMMARY OF THE INVENTION

It is, therefore, the object of this invention to provide a new and improved automatic sheet stacker which is adapted to remove all scrap material from individual sheets being conveyed thereby, and which is further adapted to operate at high speeds so as to be compatible with modern rotary die cutters while conveying and stacking a plurality of individual sheets in a perfectly aligned uniform stack.

The improved sheet stacker of this invention includes a conventional base and conveyor frame which is connected to the base and automatically moved relative to the base by means of a raising and lowering device such as is described in the aforesaid U.S. Pat. No. 3,321,202. However, it is at this point that the similarity between improved stacker of this invention and the aforementioned patent ends. Rather than having one set of conveyor belts as do conventional stackers, the stacker of this invention utilizes four sets or revolving conveyor belts. Two sets of lower conveyor belts are provided and are separated horizontally by a gap of approximately one foot. Positioned above the lower belts are two sets of upper conveyor belts which overlap each other and are not separated by a gap. The improved stacker of this invention further includes a plurality of revolving brushes positioned at various lateral locations to remove all scrap material from the individual sheets being conveyed by the stacker and a conveyor system to collect and transport away the removed scrap particles. In operation, an individual sheet is introduced into the stacker so as to be securely held by and conveyed between the upper and lower sets of belts. The use of both upper and lower belts to securely hold the sheets being conveyed allowed the improved stacker of this invention to run at high speed without causing misalignment of the sheets. The revolving brushes are positioned so that scrap material on the edges of the sheet or in the interior designs cut into the sheet is removed and drops thru the gap between two sets of lower conveyor belts onto a scrap conveyor system which collects and transports such scrap material away from the stacker. Thus, the improved stacker of this invention eliminates scrap materials and virtually eliminates alignment problems so that it can function at a speed compatible with a modern rotary die cutter while conveying and stacking in a uniform and perfectly aligned stack a plurality of individual sheets of paperboard of the like.

Other objects, features and advantages of this invention will become obvious upon reference to the following detailed description and drawings illustrating a preferred embodiment of the invention.

In the drawings:

FIG. 2 is a schematic exploded view of the conveyor belts, brushes, and scrap removal conveyor components which comprise the unique features of this invention.

DETAILED DESCRIPTION OF THE INVENTION

Figure 1:
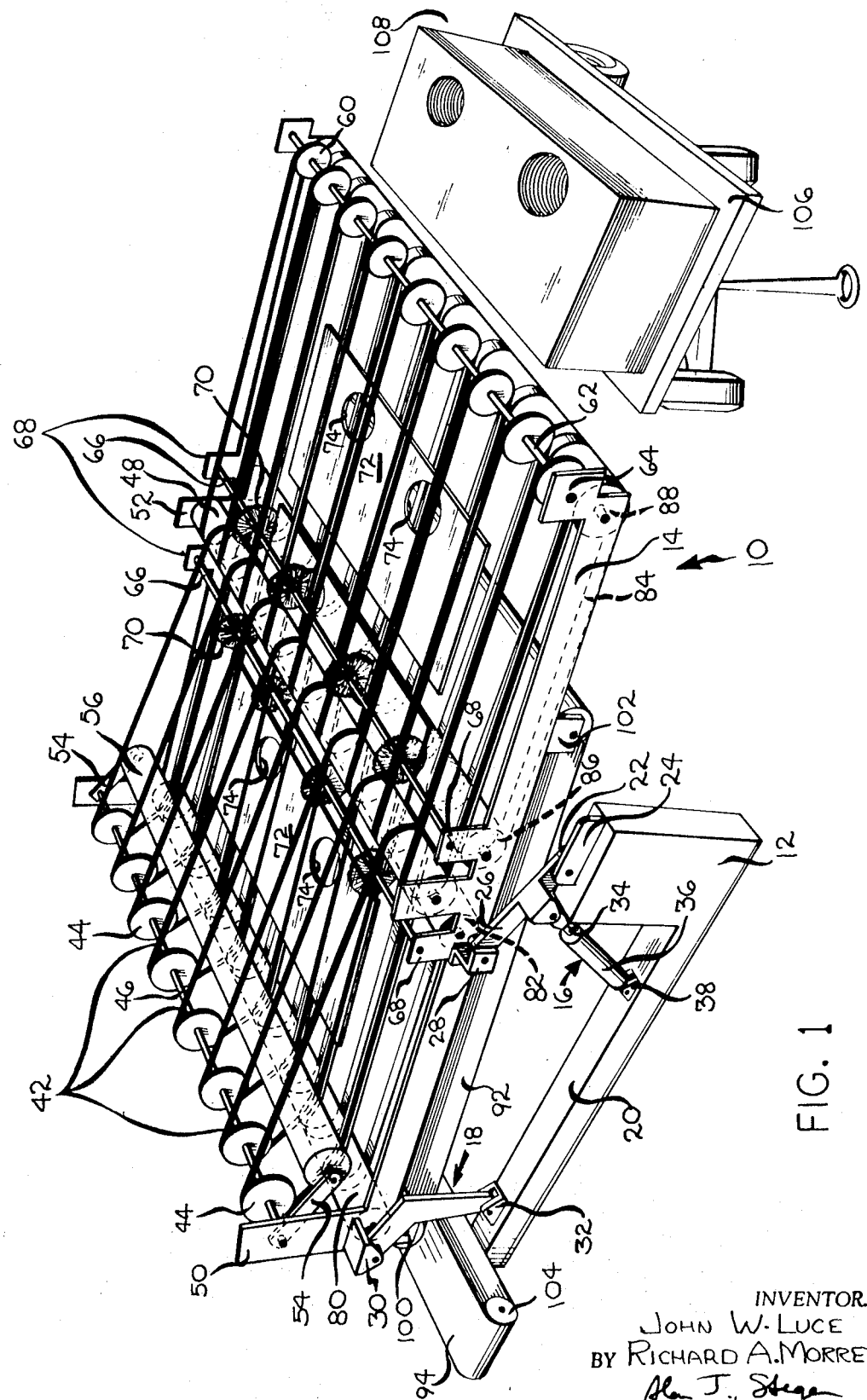
FIG. 1 is a perspective view of the improved sheet stacker of this invention.

In general, FIG. 1 shows an improved sheet stacker 10. The stacker apparatus of this invention includes a base 12 on which is swingably supported a conveyor or a stacker frame 14 partly by an adjustable raising and lowering mechanism 16 connected to about the middle of the conveyor frame 14 and by a compensating lever device 18 at the intake end of the apparatus. The base frame 12 includes heavy side members 20 of suitable structural material to support the weight of the conveyor frame 14 and the conveyor apparatus to be described later. The raising and lowering device 16 is connected to lever arms 22 which is pivotally supported at one end on an adjacent bracket 24 which extends upwardly from the base member 12. The other end of the lever arm 22 is connected by a pivot 26 to a yoke bracket 28 fixed to the outside of the conveyor stacker frame 14. The intake end of the stacker conveyor frame 14 has another yoke bracket 30 in which is pivoted the upper end of the compensating lever 18. The lower end of the compensating lever 18 is journalled in a bracket 32 on the upper surface of the side member 20 of the base 12.

To each lever arm 22 is pivotally connected a piston rod 34 connected to a piston (not shown) which is housed for reciprocating movement within a cylinder 36. The closed end of the cylinder 36 is fulcrumed in a journal bracket 38 on the top side of the side member 20 of the base 12. It should be understood that as a pressure producing medium is admitted into the cylinders 36, the piston rod 34 is actuated to move upwardly to push the respective levers 22 upwardly around the journals in the respective bracket plates 24. Since the lever arms 22 extend toward the intake end of the stacker conveyor frame 14 and toward the compensating lever arms 18, the stacker conveyor frame 14 is swung upwardly and the discharge end thereof travels on a substantially vertical plane.

The main feature of this invention, namely, the unique combination of conveying means and scrap removal brushes, is shown mounted to the stacker conveyor frame 14 in FIG. 1. The components are shown in schematic exploded relationship in FIG. 2. An upper conveyor system, indicated generally by the numeral 40 in FIG. 2, includes a first set of upper belts 42 which are mounted to rotate at one end around a plurality of pulleys 44 on a shaft 46 and around a roller shaft 48 at the other end. It should be noted in FIG. 1 that the pulley mounting shaft 46 is supported in an upwardly extending flange portion 50 on the conveyor frame 14. It should be noted that for simplicity the pulleys 42 and shaft 46 have been shown schematically as a roller shaft in FIG. 2. The roller shaft 48 is pivotally mounted to another flange 52 extending upwardly from the conveyor frame 14.

A slack adjusting roll 56 is pivotally mounted on pulley shaft 46 by means of lever arms 54. It is the function of the slack adjusting roll 56 to bear downwardly on the first set of upper belts 42 to thereby eliminate any slack in these belts and to provide a downward pressure on the sheets as they first enter the stacking device.

The upper conveyor system 40 further includes a second set of upper belts 58 which are mounted to rotate at one end around a plurality of pulleys 60 on a shaft 62 and around the roller shaft 48 at the other end. It should be noted in FIG. 1 that the pulley mounting shaft 62 is supported in an upwardly extending flange portion 64 on the conveyor frame 14. Again, for simplicity, the pulleys 60 and shaft 62 have been shown schematically as a roller shaft in FIG. 2. Thus, each of the first and second sets of upper belts 42 and 58 respectively, are mounted to be rotated by the common roller shaft 48, and, as a result, overlap each other.

The upper conveyor system 40 further includes a pair of brush mounting shafts 66 which are supported in upwardly extending flange portions 68 on the conveyor frame 14. Mounted on each of these brush shafts 66 are a plurality of rotary brushes 70. It is the function of these brushes 70 to remove all scrap material from the sheets that are being conveyed through the stacker device 10. The positioning of these brushes 70 will be determined by the size and configuration of the sheets 72 that pass through the stacker. For example, as shown in FIG. 1, the brushes 70 have been positioned to remove scrap from the outside edges of the panels of the sheets 72 and also to remove scrap that may remain after the die cutting of holes 74 in the sheet 72. It should be understood that the number and position of the brushes 70 may be adjusted to accommodate various sizes of sheets and die cut configurations.

A lower conveyor system, indicated generally by the numeral 76, in FIG. 2, includes a first set of lower belts 78 which are mounted for rotation around a pair of roller shafts 80 and 82. The roller shafts 80 and 82 are supported by the conveyor frame 14. The lower conveyor system 76 further includes a second set of lower conveyor belts 84 which are mounted for rotation around a pair of roller shafts 86 and 88. Roller shafts 86 and 88 also are supported by the conveyor frame 14. It should be noted that the first and second set of lower belts 78 and 84, respectively, are mounted on their roller shafts so that a longitudinal space or gap 90 remains between the two sets of belts. This gap 90 is positioned generally below the area in the upper conveyor system where the rotary scrap removal brushes 70 are positioned. Thus, this gap 90 serves as a removal path for the scrap particles which have been removed from the sheets 72 by the brushes 70.

The unique sheet stacker 10 of this invention further includes a large scrap collecting conveyor 92 which extends across the full width of the lower conveyor system 76 to collect all scrap particles which have been removed by the brushes 70. The scrap collector conveyor 92 transports all scrap particles towards the intake end of the stacker and deposits them on a scrap removal conveyor 94 which transports these scrap particles away from the stacker device 10. It should be noted that the scrap collector conveyor 92 is mounted on and rotated by a pair of roller shafts 96 and 98 which in turn are positioned in a pair of downwardly extending flanges 100 and 102 on the conveyor frame 14. Similarly, the scrap removal conveyor 94 is rotated at its opposite end by roller shafts 104 which are rotatably mounted to the base 12 by means not shown.

In operation, the stacker of this invention 10 is positioned adjacent to a suitable mechanism, such as a rotary die cutter, from which individual sheets are to be received, conveyed and stacked. As viewed in FIG. 1, the individual sheets 72 enter the stacker 10 at its intake end (left side of FIG. 1) and are fed between the first set of upper belts 42 and the first set of lower belts 78. Thus, the first set of lower belts 78 support the sheet 72 on its lower surface while the first set of upper belts 42 engage the upper surface of the sheet 72 and combine with the lower belt 78 to hold the sheet 72 in an aligned position. The sheet 72 is then fed toward the center of the stacker device 10 where it is contacted by the brushes 70 to remove all scrap particles from its edges and from the configuration cut therein. As it passes through the center portion of the stacker 10, it is engaged by the second set of upper belts 58 and the second set of lower belts 84. Those particles which have been removed by the brushes 70 fall downwardly between the various belts and also through the gap 90 between the first and second set of lower belts 78 and 84 onto the scrap collection convyeor 92. These particles are then conveyed on scrap collection conveyor 92 and deposited on scrap removal conveyor 94. Meanwhile, the scrap-free and perfectly aligned sheet 72 is conveyed by the second set of upper and lower belts 58 and 84, respectively, to the stacking end of the stacker 10 (right end in FIGS. 1 and 2). At the stacking end of the stacker 10, the individual sheets 72 are deposited on a stacking cart 106 and form a uniform perfectly aligned stack 108. As mentioned previously, the stacker device 10 of this invention is adapted by means of the raising and lowering device 16 to automatically raise its stacking end to correspond with the height of the stack 108. Additionally, it should be noted that the stacker device of this invention will include standard corner guides and backstops (not shown) to guide the sheet onto the stack 108.

Thus, it can be seen that through the incorporation of many unique features, the stacker device of this invention can be operated at very high speeds so as to be campatible with high speed rotory die cutters and also is adapted to provide uniform and completely aligned stacker sheets. The incorporation of both upper and lower belts provides the control necessary to keep the sheets in a perfectly aligned position while running the conveyor stacker at a high speed. The incorporation of the rotary scrap removal brushes and the gap in the lower set of belts provides for the complete removal of all scrap particles from the sheets which have been left by the previous die cutting operation. The removal of the scrap particles further facilitates the neat and uniform stacking of the sheets after they have passed through the conveyor portion of the stacker of this invention.

Therefore, the unique stacking device as provided by this invention overcomes the disadvantages associated with conventional such stackers and will be compatible with modern rotary die cutters and allow such sheet formation operations to be run at top speed thereby maximizing production and reducing costs.

We claim:

1. A machine for conveying a plurality of individual sheets in precise alignment, removing scrap materials from said sheets and depositing said sheets in a uniform stack at a collection point, said machine comprising in combination:
   a base;
   a stacker conveyor frame having an intake end and a stacking end;
   means to swingably support said stacker frame on said base;
   lower sheet conveyor means on said stacker frame to support sheets on their lower surface and convey the sheets from the intake end to the stacking end of said stacker frame;
   upper sheet conveyor means on said stacker frame overlying said lower conveyor means to engage the upper surface of said sheets supported on said lower conveyor means to cooperate with said lower conveyor means to hold said sheets in alignment and convey said sheets from the intake end to the stacking end of said stacker frame;
   brush means on said stacker frame to remove scrap material from said sheets being conveyed by said lower and upper conveyor means;
   and means connected to said support means to raise the stacking end of said stacker frame for stacking the sheets conveyed to said stacking end and to lower said stacker frame after a stack of said sheets is completed.

2. A machine as set forth in claim 1 wherein said lower sheet conveyor means comprises two sets of belts each of said sets including a plurality of individual, laterally spaced, parallel belts, said lower sets being positioned in spaced apart lengthwise relation so that a longitudinal gap remains between said lower sets of belts.

3. A machine as set forth in claim 2 wherein said upper sheet conveyor means comprises two sets of belts each of said sets including a plurality of individual, laterally spaced parallel belts, said upper sets being positions in overlapping lengthwise relation, the individual belts in said upper sets being of greater length than the individual belts in said lower sets.

4. A machine as set forth in claim 3 further including a scrap collection conveyor means on said stacker conveyor frame underlying said lower sheet conveyor means for receiving and conveying scrap particles removed by said brush means.

5. A machine as set forth in claim 4 wherein said brush means includes a plurality of laterally spaced rotary brushes, positioned generally above said longitudinal gap between said lower sets of belts so that the scrap material removed from said sheets by said brushes drops through said gap to said scrap collection conveyor.

6. In a machine for stacking sheets issuing from a rotary die cutter,
   a base;
   a stacker conveyor frame having an intake end and a stacking end;
   means to swinably support said stacker frame on said base;
   lower sheet conveyor means on said stacker frame to support sheets on their lower surface and convey the sheets from the intake end to the stacking end of said stacker frame;
   upper sheet conveyor means on said stacker frame overlying said lower conveyor means to engage the upper surface of said sheets supported on said lower conveyor means to cooperate with said lower conveyor means to hold said sheets in alignment and convey said sheets from the intake end to the stacking end of said stacker frame;
   brush means on said stacker frame to remove scrap material from said sheets being conveyor by said layer and upper conveyor means;
   and means connected to said support means to raise the stacking end of said stacker frame for stacking the sheets conveyed to said stacking end and to lower said stacker frame after a stack of said sheets is completed.

References Cited
UNITED STATES PATENTS

| | | | |
|---|---|---|---|
| 1,947,748 | 2/1934 | Van Wormer | 15—77 X |
| 1,428,952 | 9/1922 | Fuhr | 93—36 A X |
| 2,632,197 | 3/1953 | Moss et al. | 15—77 X |

JAMES M. MEISTER, Primary Examiner

U.S. Cl. X.R.

15—77; 83—101; 93—36 R